(12) United States Patent
Chen

(10) Patent No.: US 11,914,045 B2
(45) Date of Patent: Feb. 27, 2024

(54) LIDAR AND STORAGE MEDIUM

(71) Applicant: SUTENG INNOVATION TECHNOLOGY CO., LTD., Shenzhen (CN)

(72) Inventor: Huazhou Chen, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/221,875

(22) Filed: Jul. 13, 2023

(65) Prior Publication Data

US 2024/0036211 A1 Feb. 1, 2024

(30) Foreign Application Priority Data

Jul. 26, 2022 (CN) .......................... 202210884787.7

(51) Int. Cl.
| | |
|---|---|
| *G01S 17/93* | (2020.01) |
| *G01S 7/481* | (2006.01) |
| *G01S 7/4861* | (2020.01) |
| *G01S 7/487* | (2006.01) |
| *G01S 17/04* | (2020.01) |

(52) U.S. Cl.
CPC .............. *G01S 17/93* (2013.01); *G01S 7/481* (2013.01); *G01S 7/4861* (2013.01); *G01S 7/487* (2013.01); *G01S 17/04* (2020.01)

(58) Field of Classification Search
CPC ........ G01S 17/93; G01S 7/487; G01S 7/4861; G01S 7/481; G01S 17/84
USPC ......................................................... 356/4.01
See application file for complete search history.

(56) References Cited

FOREIGN PATENT DOCUMENTS

CN 108490419 A 9/2018

OTHER PUBLICATIONS

First Office Action issued in related Chinese Application No. 202210884787.7, dated Sep. 6, 2022, 10 pages.

*Primary Examiner* — Daniel L Murphy
(74) *Attorney, Agent, or Firm* — BAYES PLLC

(57) ABSTRACT

This application discloses a LiDAR, where the LiDAR includes: an emission apparatus, configured to emit a detection laser beam; a scanning apparatus, configured to receive the detection laser beam and emit the detection laser beam to a detection field of view, and to receive an echo laser beam and deflect the echo laser beam to the receiving apparatus; and a receiving apparatus, configured to receive the echo laser beam.

7 Claims, 9 Drawing Sheets

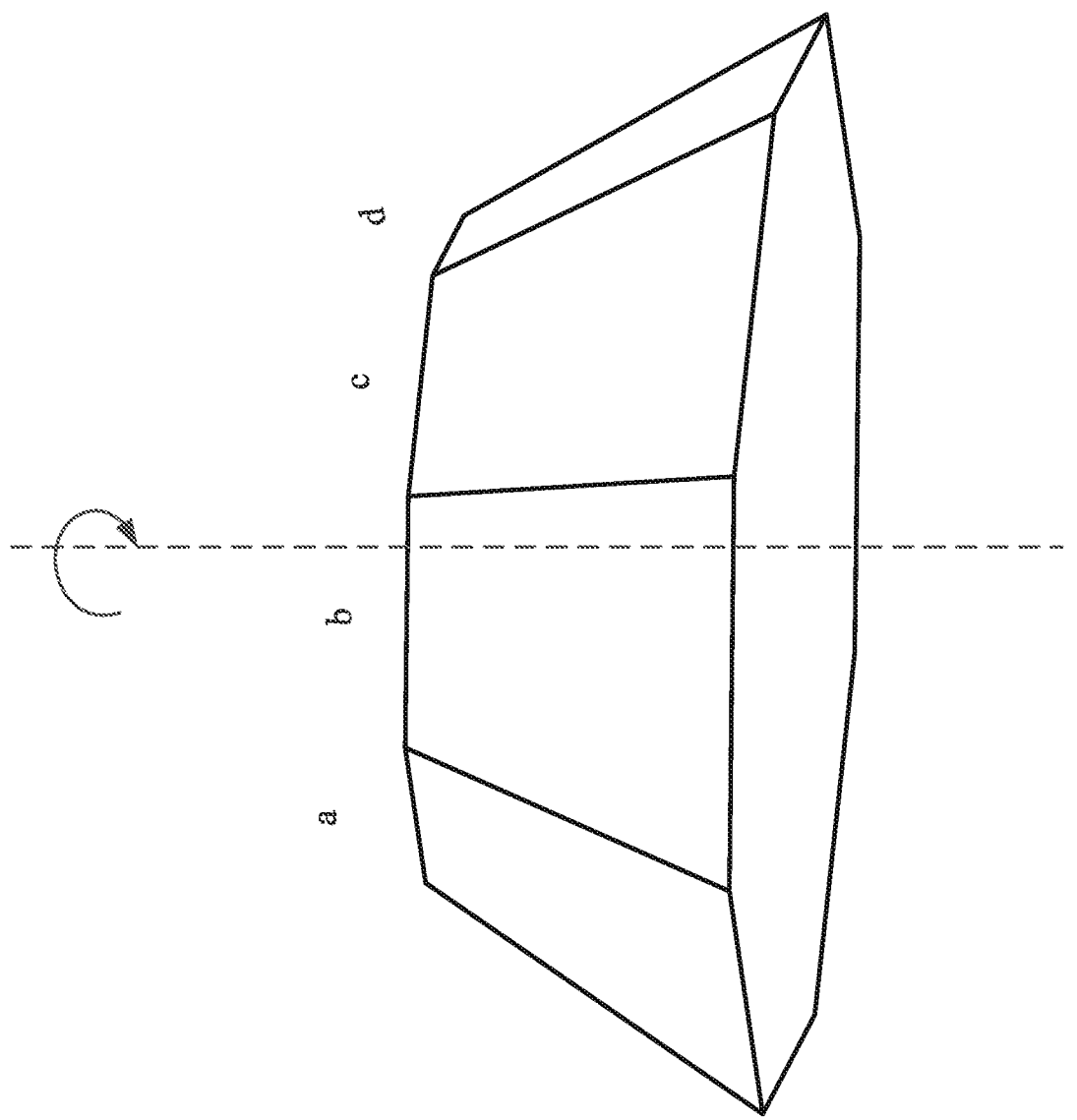

LIDAR AND STORAGE MEDIUM

CROSS-REFERENCE TO RELATED APPLICATION

The present application claims the benefit of priority to Chinese Patent Application No. 202210884787.7, filed on Jul. 26, 2022, which is hereby incorporated by reference in its entirety.

TECHNICAL FIELD

This application relates to the field of computer technologies, and in particular, to a LiDAR and a storage medium.

BACKGROUND

LiDARs can directly fast image three-dimensional space with high precision, and therefore, have become one of the most core sensors in existing autonomous driving technologies. LiDARs using rotating mirrors for scanning are current mainstream implementations of LiDARs. At present, in these LiDARs, regularly-shaped multi-sided rotating mirrors are mainly used, including three-sided mirrors, four-sided mirrors, five-sided mirrors, and eight-sided mirrors. An outgoing laser beam is deflected to the detection field of view via the rotating mirror to complete scanning.

In fact, a vehicle-mounted LiDAR needs to have small scanning range and high resolution for a distant object. It is difficult for conventional LiDARs using rotating mirrors for scanning to implement this mode.

SUMMARY

Embodiments of this application provide a LiDAR and a storage medium, which can densify a target detection field of view by using an irregularly-shaped multi-sided rotating mirror for scanning, thereby meeting a requirement of implementing a large field of view and low resolution for a short-distance object, and achieving a small field of view and high resolution for a long-distance object. A technical solution is as follows.

According to a first aspect, an embodiment of this application provides a LiDAR, where the LiDAR includes: an emission apparatus, configured to emit a detection laser beam; a scanning apparatus, configured to receive the detection laser beam and emit the detection laser beam to a detection field of view, where the scanning apparatus is also configured to receive an echo laser beam and deflect the echo laser beam to a receiving apparatus; and the receiving apparatus, configured to receive the echo laser beam; where the scanning apparatus includes a rotating mirror, and the rotating mirror includes multiple scanning surfaces, where divergence angles of at least two adjacent scanning surfaces in the multiple scanning surfaces corresponding to a center of the rotating mirror are unequal.

According to a second aspect, an embodiment of this application provides a computer storage medium, where the computer storage medium stores multiple instructions, and the instructions are capable of being loaded by a processor to perform the foregoing steps.

According to a third aspect, an embodiment of this application provides a LiDAR, including a processor and a memory, where the memory stores a computer program, and the computer program is capable of being loaded by the processor to perform the foregoing steps.

The beneficial effects provided by the technical solutions of some embodiments of the present application include at least as follows.

Based on the embodiments, the emission apparatus emits the detection laser beam, and the scanning apparatus receives the detection laser beam, emits the detection laser beam to the detection field of view, receives the echo laser beam and deflects the echo laser beam to the receiving apparatus. Then the receiving apparatus receives the echo laser beam. The scanning apparatus includes a rotating mirror, the rotating mirror includes multiple scanning surfaces, and the divergence angles of the at least two adjacent scanning surfaces in the multiple scanning surfaces corresponding to the center of the rotating mirror are unequal. A target detection field of view can be densified by using an irregularly-shaped multi-sided rotating mirror for scanning, thereby meeting a requirement of achieving a large field of view and low resolution for a short-distance object, and achieving a small field of view and high resolution for a long-distance object.

BRIEF DESCRIPTION OF DRAWINGS

To explain embodiments of the present application more clearly, the following briefly introduces the drawings used in the embodiments. Obviously, the drawings in the following description are only some embodiments of the present application.

DETAILED DESCRIPTION

Figure 1:
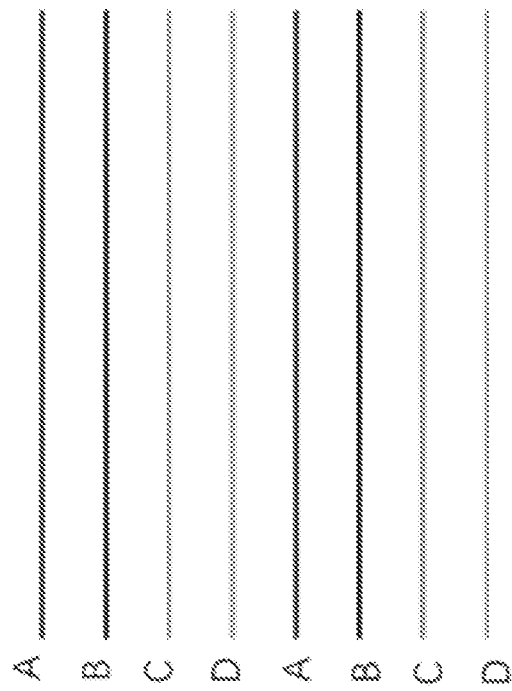
FIG. 1 is an exemplary schematic diagram of scanning of a uniform multi-sided rotating mirror according to an embodiment of this application.
Figure 1:
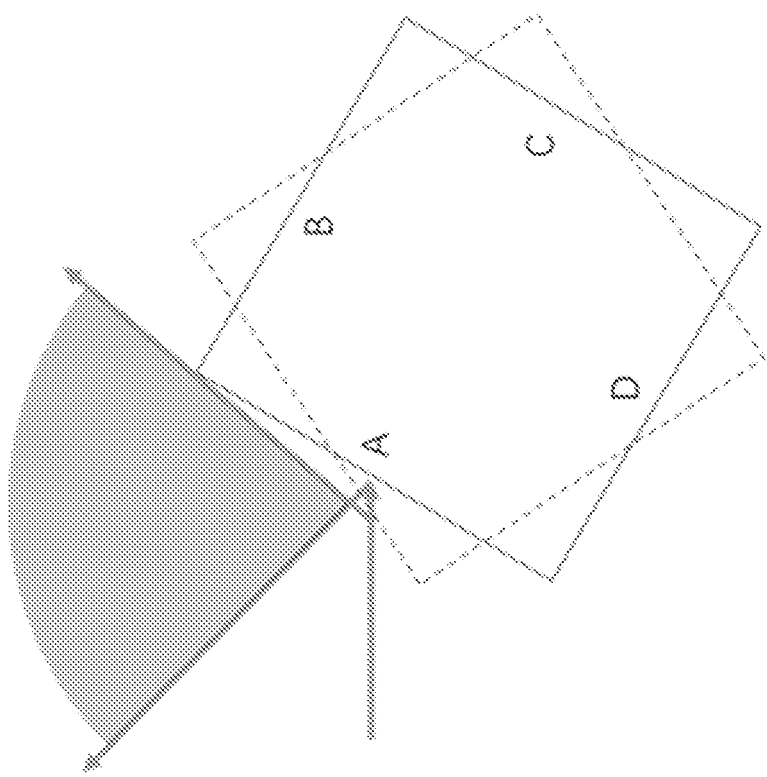

To make objectives, technical solutions, and advantages of the present application clearer, embodiments of the present application are described in further detail below with reference to the drawings.

When the following description refers to the drawings, unless otherwise indicated, the same numbers in different drawings indicate the same or similar elements. The implementation described in the following exemplary embodiments do not represent all implementations consistent with the present application. On the contrary, the implementation is merely examples of devices and methods consistent with some aspects of the present application as detailed in the appended claims.

In the description of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation. In addition, in the descriptions of this application, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" generally indicates an "or" relationship between the associated objects.

LiDARs can directly fast image three-dimensional space with high precision, and therefore, have become one of the most core sensors in existing autonomous driving technologies. LiDARs using rotating mirrors for scanning are current mainstream implementations of LiDARs. At present, in these LiDARs, regularly-shaped multi-sided rotating mirrors are mainly used, including three-sided mirrors, four-sided mirrors, five-sided mirrors, and eight-sided mirrors. Each surface of the rotating mirror rotates to perform one scan. To ensure a sufficient duty cycle, the same horizontal angle range is involved in each scan. For a LiDAR of a main view, generally, a horizontally specific angle needs to be densified.

For n-sided mirrors, the maximum angle of view range supported ideally is as follows:

$$\theta_{angle} = \frac{360°}{n} * 2$$

Because a beam has a specific width, a scanning angle of the n-sided mirror is less than $\theta_{angle}$. A required scanning scope is defined as follows: $\theta_{FOV}$. For a vehicle-mounted LiDAR, the required horizontal angle is 120°. For a specific scanning mode, a current effective range is defined as the duty cycle, which characterizes magnitude of the duty cycle of the effective range in the entire scanning process. For example, for a four-sided mirror, in the vehicle-mounted LiDAR, the duty cycle is as follows:

$$\frac{\theta_{FOV}}{\theta_{angle}} = \frac{120°}{180°} = 67\%$$

All surfaces of the regularly-shaped rotating mirror are the same, and therefore, horizontal angles $\theta_{FOV}$ scanned by all the surfaces are also the same. In principle, an image of LiDAR point clouds uniformly distributed in a horizontal direction is obtained.

FIG. 1 is an example of scanning of a four-sided mirror. Four mirror surfaces are denoted as A, B, C, and D. With rotation of each surface, the beam scans to form a group of scanning lines in space, which correspond to A, B, C, and D on the right side of FIG. 1. It can be seen that a scanning line uniformly distributed in the horizontal direction is obtained in the method.

In fact, a vehicle-mounted LiDAR needs to have a small scanning range and high resolution for a distant object. It is difficult for conventional regularly-shaped rotating mirrors to implement this mode.

This application is described in detail below with reference to embodiments.

The LiDAR provided in embodiments of this application is described in detail below with reference to FIG. 2 to FIG. 7.

Figure 2:
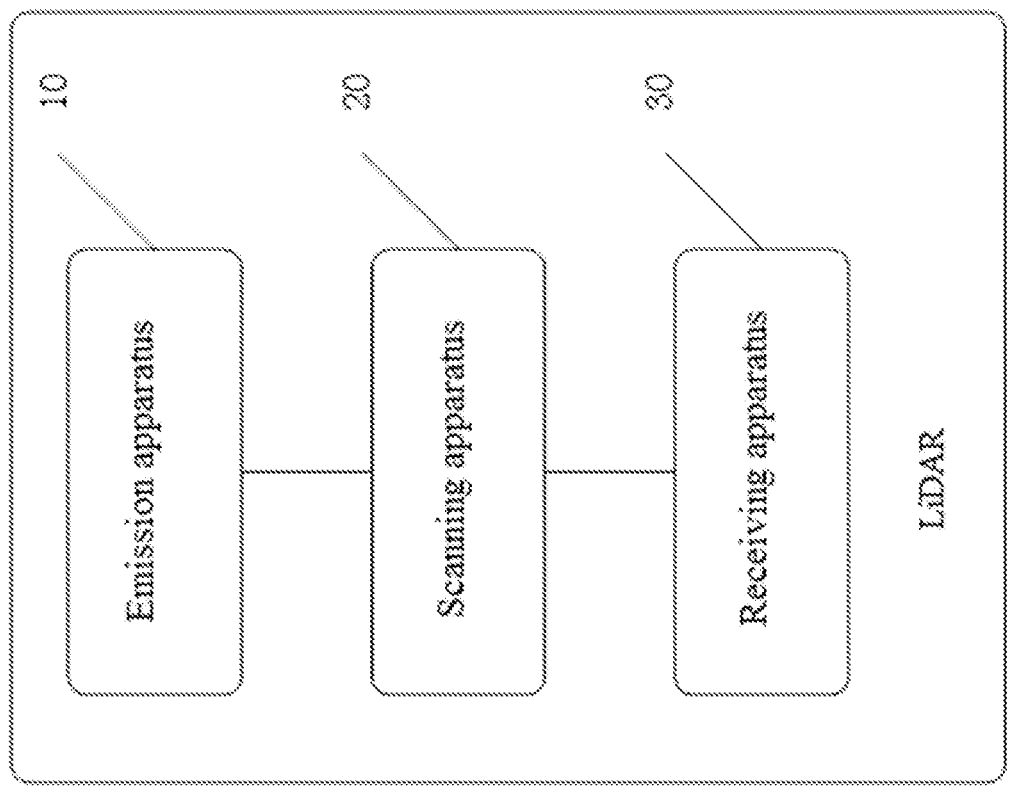
FIG. 2 is a schematic structural diagram of a LiDAR according to an embodiment of this application.

FIG. 2 is a schematic structural diagram of a LiDAR according to an embodiment of this application. The LiDAR includes an emission apparatus 10, a scanning apparatus 20, and a receiving apparatus 30. The emission apparatus 10 is configured to emit a detection laser beam; the scanning apparatus 20 is configured to receive the detection laser beam and emit the detection laser beam to a detection field of view; the scanning apparatus 20 is also configured to receive an echo laser beam and deflect the echo laser beam to a receiving apparatus 30; the receiving apparatus 30 is configured to receive an echo laser beam; and the scanning apparatus 20 includes a rotating mirror, the rotating mirror includes multiple scanning surfaces, and divergence angles of at least two adjacent scanning surfaces in the multiple scanning surfaces corresponding to a center of the rotating mirror are unequal.

The number of scanning elements included in the scanning apparatus and a combination thereof are not limited in this application. The scanning apparatus in this application may also include another scanning device in addition to the rotating mirror, for example, another rotating mirror, a one-dimensional galvanometer, or a two-dimensional galvanometer. In some embodiments, the LiDAR in this application may or may not include another scanning form in addition to the foregoing scanning apparatus. The LiDAR may also include a rotating platform in addition to the scanning apparatus.

Figure 3:
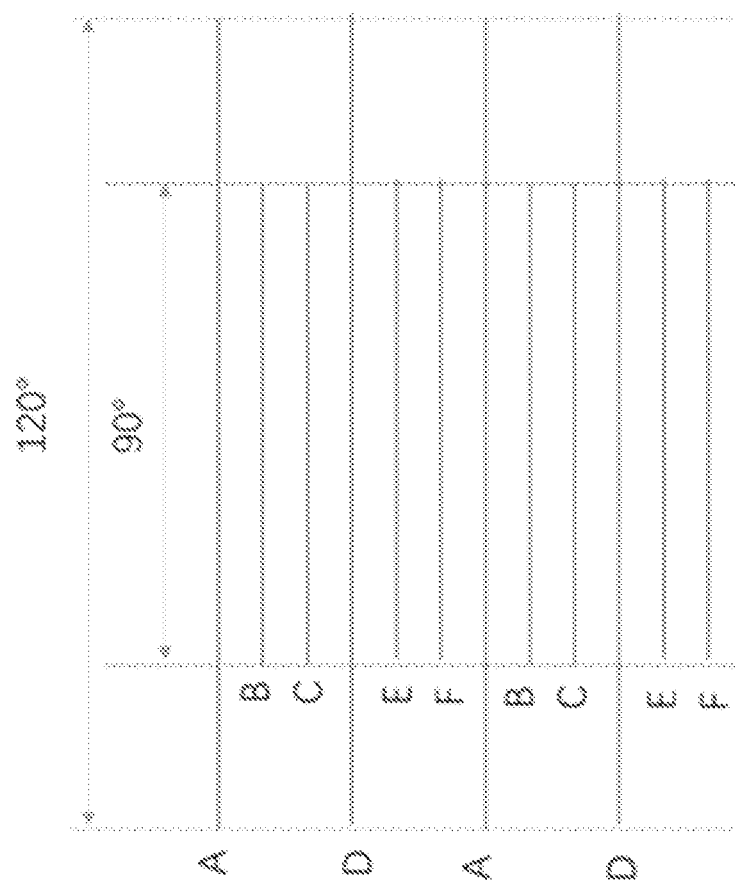
FIG. 3 is an exemplary schematic diagram of scanning of a non-uniform six-sided mirror according to an embodiment of this application.
Figure 3:
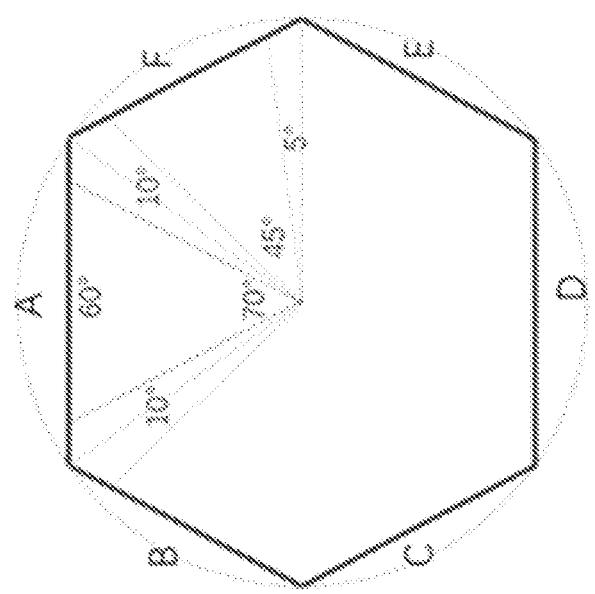

FIG. 3 is a schematic cross-sectional view of an irregularly-shaped six-sided rotating mirror. The cross section of the six-sided mirror is a plane perpendicular to a rotating shaft of the six-sided mirror. The divergence angle of the scanning surface corresponding to the center of the rotating mirror is a divergence angle of a side of the scanning surface on the cross section of the rotating mirror corresponding to a center of a circle circumscribed on the cross section of the rotating mirror. Divergence angles of at least two adjacent scanning surfaces in the multiple scanning surfaces corresponding to a center of the rotating mirror are unequal. For example, as shown in FIG. 3, divergence angles of a scanning surface A and a scanning surface F are unequal.

The detection field of view of the LiDAR includes the total detection field of view and the target detection field of view. The total detection field of view is the maximum detection field of view, the target detection field of view is the region of interest (ROI), and the region of interest (ROI) generally corresponds to a field of view parallel to a line of sight of a driver. The target detection field of view is a region of more interest to the LiDAR, and a user can make a setting for target detection as required. A position of the target detection field of view in the total detection field of view is not limited in this application. The rotating mirror includes at least one first scanning surface and at least one second scanning surface, and a divergence angle of the first scanning surface corresponding to the center of the rotating mirror is greater than a divergence angle of the second scanning surface corresponding to the center of the rotating mirror. When the target detection field of view only includes a point cloud densification multiple, that is, the LiDAR only includes a primary target detection field of view, the divergence angle of the first scanning surface corresponding to the center of the rotating mirror is determined based on the total detection angle of view, and the divergence angle of the second scanning surface corresponding to the center of the rotating mirror is determined based on the target detection angle of view.

The target detection field of view may include at least one level of detection field of view. In some embodiments, the target detection field of view may also include multiple levels of detection fields of view, for example, a primary target detection field of view, a secondary target detection field of view, a tertiary target detection field of view, . . . , a level n−1 target detection field of view, and a level n target detection field of view, where n is an integer greater than or equal to 2. It can be understood that, in general, the number of levels of detection fields of view included in the target detection field of view is not limited in this application. Each level of target detection field of view corresponds to a corresponding densification multiple. Densification multiple of the primary target detection field of view is greater than or equal to densification multiple of the secondary target detection field of view, the densification multiple of the secondary target detection field of view is greater than or equal to densification multiple of the tertiary target detection field of view, . . . , the densification multiple of the level n−1 target detection field of view is greater than or equal to densification multiple of the level n target detection field of view. The primary target detection field of view corresponds to a detection field of view closest to the center, followed by other detection fields of view.

When the rotating mirror has only the primary target detection field of view, a divergence angle of each second scanning surface of the rotating mirror corresponding to the center of the rotating mirror and the number of second scanning surfaces of the rotating mirror are determined based on the densification multiple of the target detection field of view and the angle of view corresponding to the target detection field of view.

The number of second scanning surfaces of the rotating mirror is equal to the number of groups of scanning lines in the target detection field of view minus the number of groups of scanning lines in another field of view other than the target detection field of view in the total detection field of view.

The divergence angle of the second scanning surface of the rotating mirror corresponding to the center of the rotating mirror is a sum of half of an angle of view of the target detection field of view and a set second redundant angle.

The densification multiple of the target detection field of view is equal to the number of groups of scanning lines in the target detection field of view minus the number of groups of scanning lines in another field of view other than the target detection field of view in the total detection field of view. Another field of view other than the target detection field of view in the total detection field of view may be referred to as a general detection field of view. Therefore, the densification multiple of the target detection field of view is equal to the number of groups of scanning lines in the target detection field of view minus the number of groups of scanning lines in the general detection field of view.

Assuming that the number of scanning surfaces included in the rotating mirror is n, divergence angles of all surfaces corresponding to the center of the rotating mirror are denoted as $\theta_1, \theta_2, \ldots, \theta_n$. $\theta_1, \theta_2, \ldots, \theta_n$ are sorted from the smallest value to the largest value. Because scanning is performed based on reflected light, the maximum angles of fields of view (FOV) supported for scanning are respectively $2\theta_1, 2\theta_2, \ldots, 2\theta_n$. Therefore, scanning lines that can be obtained are as follows.

For the central region, there are n groups of scanning lines;
    in a region with the angle of view greater than $2\theta_1$, there are a total of n−1 groups of scanning lines;
    in a region with the angle of view greater than $2\theta_2$, there are a total of n−2 groups of scanning lines;
    in a region with the angle of view greater than $2\theta_3$, there are a total of n−3 groups of scanning lines; and
    another position can be deduced by analogy, so that the scanning lines can be obtained by densifying the central region of the entire space.

Therefore, the divergence angle $\theta_n$ of the first scanning surface corresponding to the center of the rotating mirror is determined based on the total detection field of view, and divergence angles $\theta_1, \ldots, \theta_{n-1}$ of the second scanning surfaces corresponding to the center of the rotating mirror are separately determined based on the target detection fields of view at each level. Each second scanning surface is divided into a first short surface, a second short surface, a third short surface, . . . , an $(n-1)^{th}$ short surface, and an nth short surface, where n is an integer greater than or equal to 2. Divergence angles of at least two short surfaces in the first short surface, the second short surface, . . . , the nth short surface corresponding to the center of the rotating mirror are unequal.

When the target detection field of view includes at least two levels of target detection fields of view, the detection angle of view corresponding to the primary target detection field of view is determined based on the divergence angle of the first short surface of the rotating mirror corresponding to the center of the rotating mirror; the detection angle of view corresponding to the secondary target detection field of view is determined based on the divergence angle of the second short surface of the rotating mirror corresponding to the center of the rotating mirror; the detection angle of view corresponding to the tertiary target detection field of view is determined based on the divergence angle of the third short surface of the rotating mirror corresponding to the center of the rotating mirror; the detection angle of view corresponding to the level n−1 target detection field of view is determined based on the divergence angle of the $(n-1)^{th}$ short surface of the rotating mirror corresponding to the center of the rotating mirror; and the detection angle of view corresponding to the $n^{th}$ target detection field of view is determined based on the divergence angle of the nth short surface of the rotating mirror corresponding to the center of the rotating mirror. Herein, n is an integer greater than or equal to 2.

The divergence angle of the first scanning surface corresponding to the center of the rotating mirror is a sum of half of an angle of view of the total detection field of view and a set first redundant angle.

Taking the target detection field of view including two levels of target detection fields of view as an example, the target detection field of view includes a primary target detection field of view and a secondary target detection field of view, and a densification multiple of the primary target detection field of view is greater than a densification multiple of the secondary target detection field of view. The LiDAR includes a first scanning surface, a third scanning surface, and a fourth scanning surface; and divergence angles of the first scanning surface, the third scanning surface, and the fourth scanning surface corresponding to the center of the rotating mirror are unequal. The divergence angle of the first scanning surface corresponding to the center of the rotating mirror is a sum of half of a total detection angle of view of the LiDAR and a set first redundant angle; a divergence angle of the third scanning surface corresponding to the center of the rotating mirror is a sum of half of the angle of view of the primary target detection field of view and a set third redundant angle; the number of third scanning surfaces is equal to the densification multiple of the primary target detection field of view minus the densification multiple of the secondary target detection field of view; a divergence angle of the fourth scanning surface corresponding to the center of the rotating mirror is a sum of half of the secondary target detection angle of view and a set fourth redundant angle; and the number of fourth scanning surfaces is determined based on a densification multiple of the secondary target detection field of view. The densification multiple of the secondary target detection field of view is equal to the number of groups of scanning lines in the secondary target detection field of view minus the number of groups of scanning lines in the general detection field of view.

FIG. 3 is a schematic diagram of a cross section of an irregularly-shaped six-sided mirror. As shown in FIG. 3, surface A and surface D are the first scanning surfaces, and have the same divergence angle corresponding to the center of the rotating mirror, and surface B, surface C, surface D, and surface E are the second scanning surfaces, and have the same divergence angle corresponding to the center of the rotating mirror. In consideration of width of the beam, a redundant angle of 10 degrees is set, with 5 degrees for left and right sides.

The surface A corresponds to the largest detection field of view, that is, the total detection field of view, and the angle of view is 120 degrees. Therefore, it can be determined that the divergence angle of surface A corresponding to the center of the rotating mirror is 120/2+10=70 degrees. Herein, 60 degrees are used for scanning. Similarly, the divergence angle of the surface D corresponding to the center of the rotating mirror is 70 degrees.

The redundant angle corresponding to the scanning surface is related to the size of the light spot and a proportion of the light spot to the entire scanning surface. The larger the light spot, the larger the set redundant angle; and the larger the proportion of the light spot to the entire scanning surface, the larger the redundant angle that needs to be set. Interference from stray light in a cavity can be better reduced by setting a proper redundant angle.

Each first scanning surface and each second scanning surface are combined to obtain a closed polygon, and therefore, a sum of the divergence angle of each first scanning surface corresponding to the center of the rotating mirror and the divergence angle of each second scanning surface corresponding to the center of the rotating mirror is 360 degrees.

When there is only one level of target detection field of view, the densification multiple of the target detection field of view relative to the general detection field of view is the number of second scanning surfaces. Divergence angles of the second scanning surfaces corresponding to the center of the rotating mirror are equal. In addition, the densification multiple of the target detection field of view can be set based on a requirement of the LiDAR.

For example, when there is only one level of target detection field of view, the densification multiple of the central detection field of view relative to the general detection field of view is 4, and the number of second scanning surfaces is 4.

Similarly, a divergence angle of each second scanning surface corresponding to the center of the rotating mirror is a sum of half of an angle of view of the target detection field of view and a set second redundant angle.

For example, as shown in FIG. 3, the second redundant angle is also 10 degrees, the angle of view of the target detection field of view is 90 degrees, and therefore, the divergence angle of the surface B corresponding to the center of the rotating mirror is 55 degrees. Similarly, the divergence angles of the surfaces C, E, and F corresponding to the center of the rotating mirror respectively are 55 degrees.

At this time, a sum of the divergence angle of the surface A corresponding to the center of the rotating mirror, the divergence angle of the surface B corresponding to the center of the rotating mirror, the divergence angle of the surface C corresponding to the center of the rotating mirror, the divergence angle of the surface D corresponding to the center of the rotating mirror, the divergence angle of the surface E corresponding to the center of the rotating mirror, and the divergence angle of the surface F corresponding to the center of the rotating mirror is 360 degrees, thereby meeting the requirement.

When there are multiple levels of target detection fields of view, the number of second scanning surfaces of the rotating mirror corresponding to each level of target detection field of view and the divergence angle of each second scanning surface corresponding to the center of the rotating mirror are calculated separately.

For example, the target detection field of view includes a primary target detection field of view and a secondary target detection field of view, a densification multiple of the primary target detection field of view is greater than a densification multiple of the secondary target detection field of view, and the LiDAR includes a third scanning surface and a fourth scanning surface; and a divergence angle of the third scanning surface corresponding to the center of the rotating mirror is a sum of half of the angle of view of the primary target detection field of view and a set third redundant angle; the number of third scanning surfaces is equal to the densification multiple of the primary target detection field of view minus the densification multiple of the secondary target detection field of view; a divergence angle of the fourth scanning surface corresponding to the center of the rotating mirror is a sum of half of the secondary target detection angle of view and a set fourth redundant angle; and the number of fourth scanning surfaces is determined based on a densification multiple of the secondary target detection field of view.

The foregoing determined first scanning surface and second scanning surface are arranged and combined to form an irregularly-shaped multi-sided rotating mirror, to further perform rotational scanning, which can densify a target detection field of view by using an irregularly-shaped multi-sided rotating mirror for scanning, thereby meeting a requirement of achieving a large field of view and low resolution for a short-distance object, and achieving a small field of view and high resolution for a long-distance object.

In some embodiments, the rotating mirror is rotationally symmetrical around the rotating shaft.

The rotating mirror further includes a drive mechanism, and the drive structure is located in a spatial region surrounded by multiple scanning surfaces of the rotating mirror, so that structural height of the rotating mirror can be reduced. The drive mechanism may be, for example, a rotating motor, the rotating motor includes a bearing, and the bearing fits the rotating shaft of the rotating mirror to drive the rotating mirror to rotate around the rotating shaft. In addition, the rotating mirror further includes a code disk, and the code disk may be, for example, a grating code disk or a vertical code disk. A specific form of the code disk of the rotating mirror is not limited in this application. The code disk can measure and encode rotation of the rotating mirror, and transmit corresponding measurement information to a control system of the LiDAR, so that the LiDAR can learn the current position and angle of the rotating mirror.

Figure 4D:
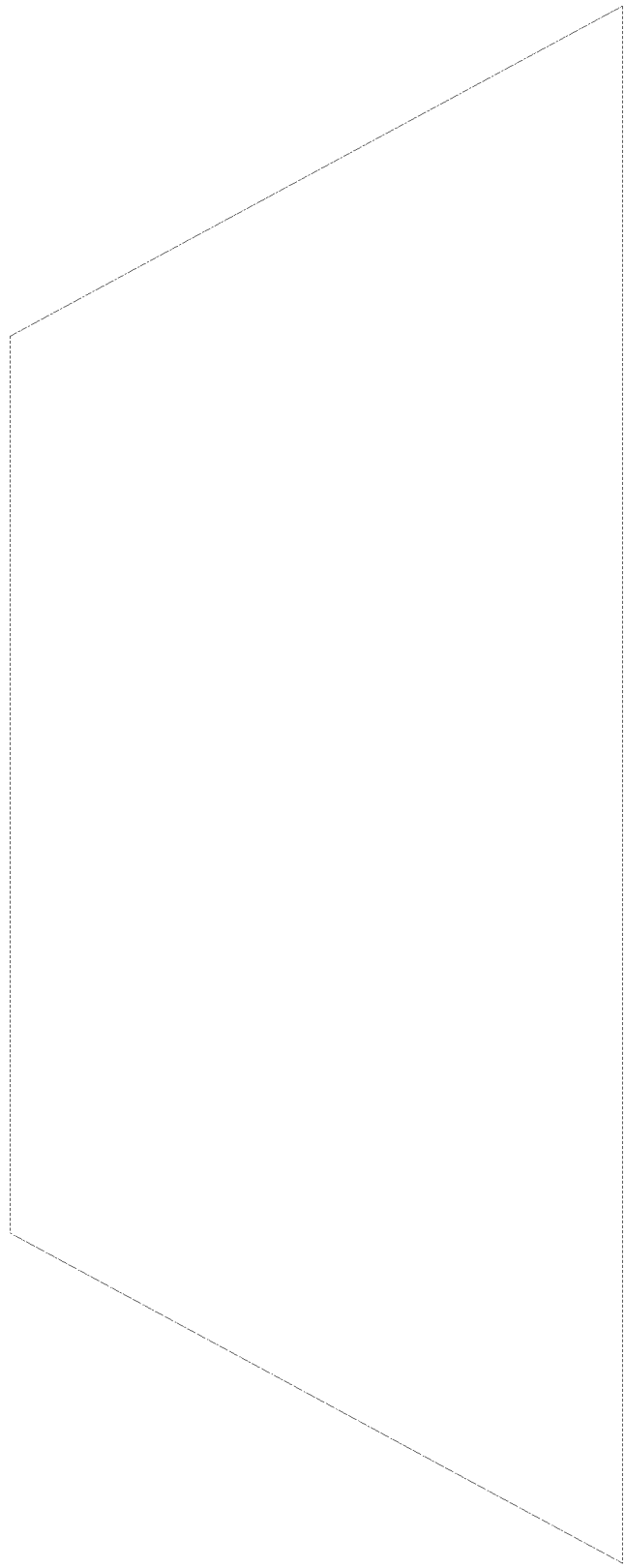
FIG. 4a is a schematic diagram of an irregularly-shaped eight-sided rotating mirror according to an embodiment of this application.
FIG. 4b is a schematic cross-sectional view of a rotating mirror according to an embodiment of this application.

Each scanning surface of the rotating mirror may be parallel to the rotating shaft of the rotating mirror. In some embodiments, all or some of the scanning surfaces of the rotating mirror may be disposed to form a preset angle with the rotating shaft of the rotating mirror. Taking an irregularly-shaped octagon as an example, FIG. 4a and FIG. 4b are schematic diagrams of cross sections of specific scanning surfaces parallel to a rotating shaft when each scanning surface of a rotating mirror is disposed to form an angle with the rotating shaft of the rotating mirror. Setting an inclination angle of each scanning surface can further improve the effect of densification in the vertical direction.

It should be noted that some embodiments of this application are applicable to densification of various irregularly-shaped multi-sided rotating mirrors, and the process is similar to that in the above description, but a densification multiple is different.

Further, in some embodiments of this application, by setting the divergence angle of the emission apparatus, the LiDAR satisfies:

$$\delta\theta = \frac{L}{f}$$

where L is the light emission size of a light source of the emission apparatus, and f is focal length of the emission apparatus. By reducing the divergence angle, ranging can be improved under a condition of controlling laser power.

In some embodiments, in addition, as required for the group of scanning lines, the interval between the lasers and the divergence angle are at the same order. The interval between the scanning lines of the two adjacent groups of emissions apparatuses satisfies:

$$\Delta\theta = \frac{L_{LD}}{f}$$

where $L_{LD}$ is the interval between the lasers in the emissions apparatus, and f is focal length of the emissions apparatus; and it can be seen that improving the focal length of the system and reducing an area L of the light source and an interval $L_{LD}$ of the light source can reduce the divergence angle $\delta\theta$ and the interval $\Delta\theta$ between the scanning lines.

With the same scanning apparatus, reducing the interval $\Delta\theta$ between the scanning lines can reduce the interval between point clouds, increase density of the point cloud, and improve a frame rate of the point cloud, thereby improving detection resolution of the LiDAR. In addition, reducing the divergence angle $\delta\theta$ can further improve ranging with the same density of the point cloud.

Figure 5A:
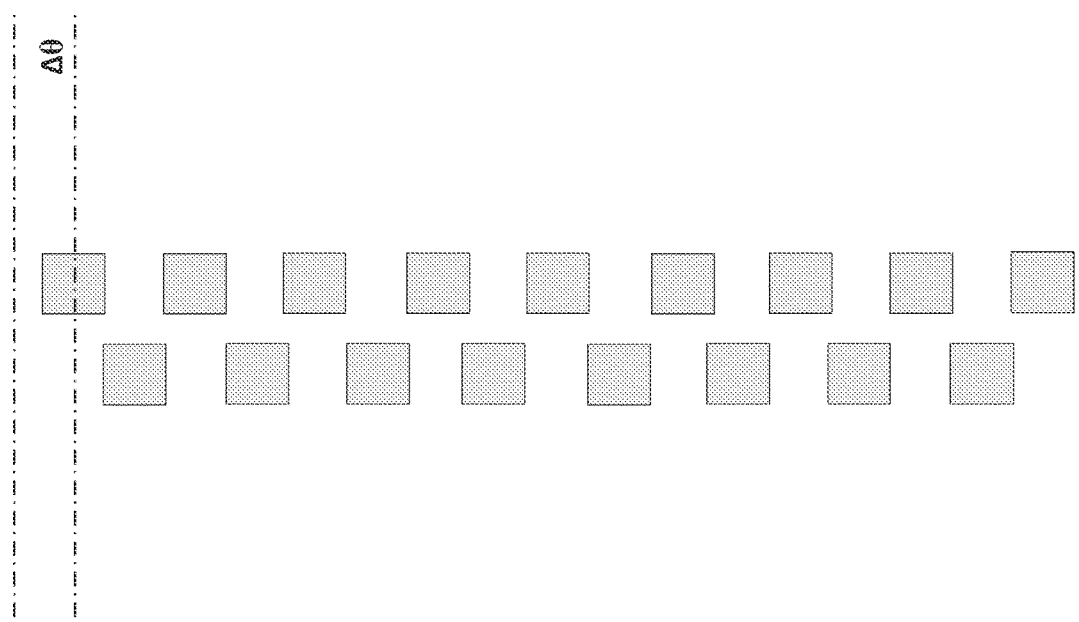
FIG. 5a is a schematic diagram of arrangement of the same group of emitters according to an embodiment of this application.
Figure 5B:
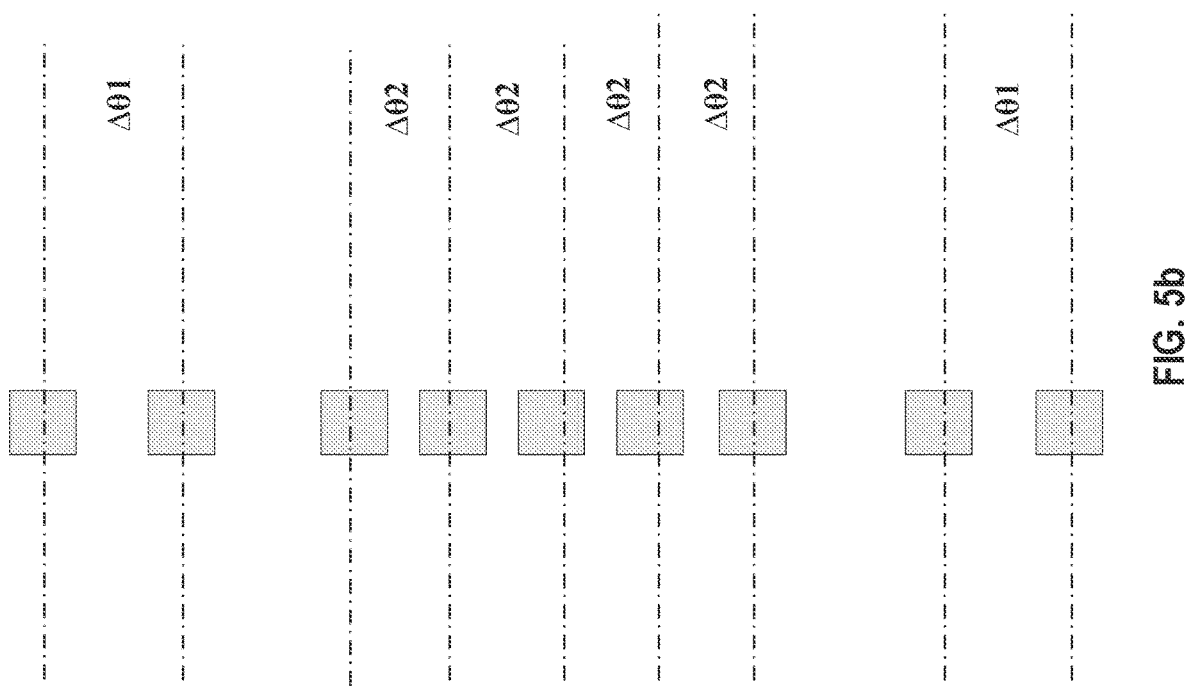
FIG. 5b is another schematic diagram of arrangement of the same group of emitters according to an embodiment of this application.

The interval $\Delta\theta$ between the scanning lines can be implemented by setting the arrangement interval of the emitters, or controlling emitting lasers to perform emission at intervals in some or all of the regions. It should be noted that the interval $\Delta\theta$ between the scanning lines herein may be implemented in a manner not limited to that in the foregoing description. Same emission group can be arranged in one column or different columns. When the same emission group is arranged in two columns, as shown in FIG. 5a, $\Delta\theta$ can be reduced by arranging all the emitters in the same emission group in a staggered manner; or $\Delta\theta$ in a target region is reduced by arranging emitters in a staggered manner in a partial region. With such a design, the point cloud density in the target region can be further improved while the setting of the scanning apparatus remains unchanged. When the emitters in the same emission group are arranged in a column, the interval between the emitters at the edge and the interval between the emitters in the central region can also be set to be different, so that a point cloud in the target region is denser. As shown in FIG. 5b, an interval between edge emitters in the same emission group is $\Delta\theta1$, and an interval between central emitters is $\Delta\theta2$, where $\Delta\theta2 \geq \Delta\theta1$.

In some embodiments, the emission apparatus 12 is an edge emitting laser or a vertical cavity surface emitting laser, and the power of the emission apparatus is greater than 1000 W/mm2, thereby reducing L.

In some embodiments, the emission apparatus 12 uses an array light source of an all-in-one edge emitting laser or vertical cavity surface emitting laser. With this array structure, the physical interval $L_{LD}$ between different lasers can be decreased to 0.3 mm to 0.4 mm.

In some embodiments, the emission apparatus 12 uses a telephoto optical path to increase f.

In some embodiments, when the LiDAR is in a mode in which one emission corresponds to at least two receptions, and the densification multiple includes a horizontal point cloud densification multiple or a vertical point cloud densification multiple, an interval between scanning lines corresponding to two adjacent emissions is a quotient of dividing a first product by a second product. The first product is calculated by multiplying the number of scanning lines of each emission group by the interval between the scanning lines of each emission group, and the second product is calculated by multiplying the vertical point cloud densification multiple by the horizontal point cloud densification multiple. The horizontal point cloud densification multiple is divisible by a product of multiplying the number of scanning lines of each emission group by the number of receivers corresponding to each emitter, and the vertical point cloud densification multiple is a prime number indivisible by the product of multiplying the number of scanning lines of each emission group by the number of receivers corresponding to each emitter. In some embodiments, when the rotating mirror is used for horizontal densification, vertical densification can be further implemented by disposing one emitter corresponding to multiple receptions. The vertical densification multiple is related to the number of receivers corresponding to one emitter. In some embodiments of this application, if the horizontal densification is implemented by the rotating mirror, the vertical densification is related to the interval between the scanning lines and/or a correspondence between numbers of emitters and receivers. The interval between the scanning lines can be implemented by setting an arrangement interval between emitters or by controlling emitting lasers to perform emission at intervals in some or all of the regions. The correspondence between the emitter and the receiver can be one-to-one (that is, one emitter corresponds to one receiver) or one-to-many (that is, one emitter corresponds to multiple receivers). Correspondence between the same group of emitters and receivers may be completely or partly the same. For the correspondence between the emitter and the receiver, a relationship between an emitter and a receiver in an edge field of view can be a relationship that one emission corresponds to one reception, and a relationship between an emitter and a receiver in a central field of view can be a relationship that one emission corresponds to multiple receptions, thereby forming the detection field of view.

Figure 6C:
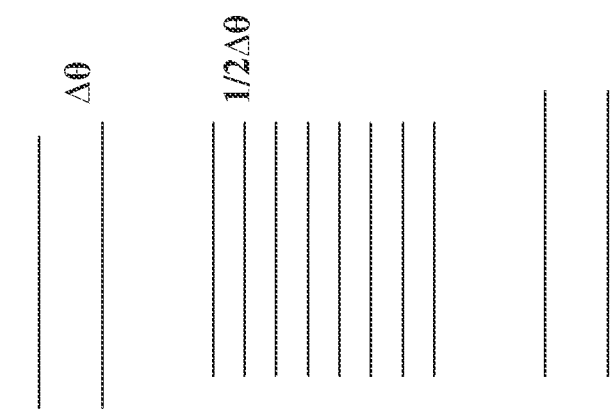
FIGS. 6a-6c are exemplary schematic diagrams of improving point cloud density in a single-emission multiple-reception mode according to an embodiment of this application.
Figure 6B:
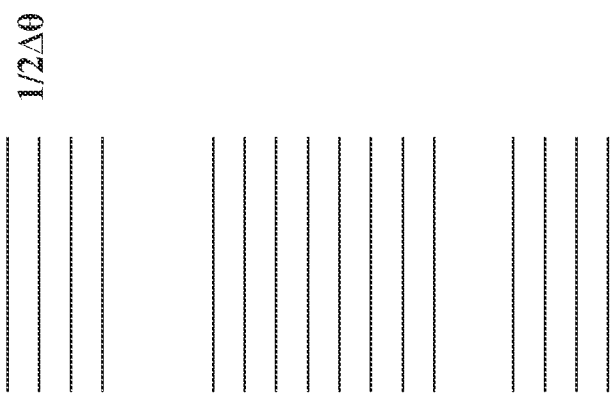
Figure 6A:
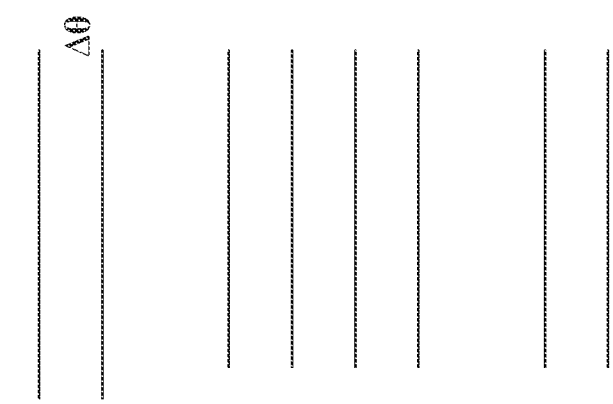

FIG. 6a shows an interval between scanning lines of the emitter, and FIG. 6b is a schematic diagram of density of the point cloud formed via 1 emitter corresponding to 2 receivers. If 1 emitter corresponds to 2 receivers, the density of the point cloud in the entire field of view can be doubled, and the interval between the formed point clouds becomes half of the original interval between scanning lines. FIG. 6c shows a one-to-one correspondence between the emitter and the receiver in the edge field of view, and a one-to-two correspondence between the emitter and the receivers in the central field of view. With such setting, the vertical densification multiple of the point cloud in the central field of view is twice the vertical densification multiple in the edge field of view, an angle interval between the point cloud within the vertical detection field of view and an angle interval in the central detection field of view are ½ of an angle interval in the edge detection field of view. With a partial one-to-many setting, the number of receivers can be reduced to the maximum extent while ensuring the density of the point cloud in the central detection field of view.

The single-emission multiple- (denoted as $n_{mul}$) reception mode is also compatible in this application. The most typical characteristic of the single-emission multiple-reception mode is that each group of scanning lines have $n_{mul}$ closely attached, because one emitted light spot corresponds to several receptions. If the density of the point cloud formed in the vertical direction in the central detection field of view is $$\frac{\delta\theta}{N'},$$

in this case, in the single-emission $n_{mul}$-reception mode, an angle interval between nearest neighbor receiving channels is kept as:

$$\delta\theta' = \frac{\delta\theta}{N' n_{mul}}$$

The scanning method of interpolation is still used, the point cloud density in the vertical direction of the central detection field of view can be increased to $\delta\theta'$.

Based on the embodiments, the emission apparatus emits the detection laser beam, and the scanning apparatus receives the detection laser beam, emits the detection laser beam to the detection field of view, receives the echo laser beam and deflects the echo laser beam to the receiving apparatus. Then the receiving apparatus receives the echo laser beam. The scanning apparatus includes a rotating mirror, the rotating mirror includes multiple scanning surfaces, and the divergence angles of the at least two adjacent scanning surfaces in the multiple scanning surfaces corresponding to the center of the rotating mirror are unequal. A target detection field of view can be densified by using an irregularly-shaped multi-sided rotating mirror for scanning, thereby meeting a requirement of achieving a large field of view and low resolution for a short-distance object, and achieving a small field of view and high resolution for a long-distance object.

Embodiments of this application also provide a computer storage medium. The computer storage medium may store a plurality of instructions. The instructions are capable of being loaded by a processor to perform the steps of the method in the embodiments shown in FIG. 2 to FIG. 6. For a specific execution process, refer to the specific description of the embodiments shown in FIG. 2 to FIG. 6. Details are not described herein again.

Figure 7:
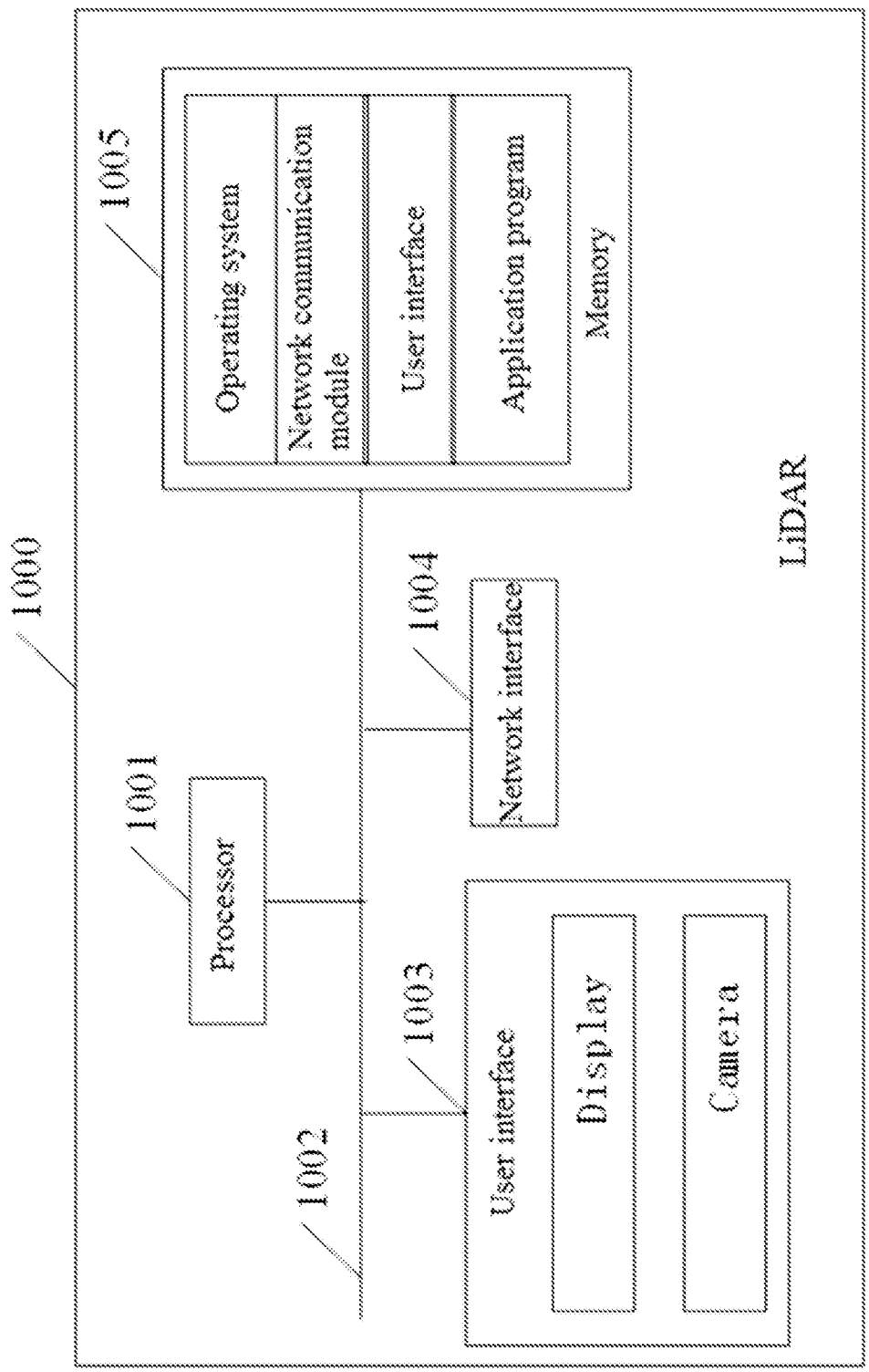
FIG. 7 is a schematic structural diagram of a LiDAR according to an embodiment of this application.

FIG. 7 is a schematic structural diagram of a LiDAR according to an embodiment of this application. As shown in FIG. 7, the LiDAR 1000 may include: at least one processor 1001, at least one network interface 1004, a user interface 1003, a memory 1005, and at least one communication bus 1002.

Herein, the communication bus 1002 is configured to implement a connection and communication between these components.

Herein, the user interface 1003 may include a display and a camera, or the user interface 1003 may further include a standard wired interface and a wireless interface.

Herein, the network interface 1004 may include a standard wired interface and a wireless interface (such as, a Wi-Fi interface).

Herein, the processor 1001 may include one or more processing cores. The processor 1001 uses various interfaces and lines to connect various parts of the entire LiDAR 1000, and executes various functions and processes data of the LiDAR 1000 by running or executing instructions, programs, code sets, or instruction sets stored in the memory 1005, and invoking data stored in the memory 1005. In some embodiments, the processor 1001 may be realized in at least one hardware form of digital signal processing (DSP), field-programmable gate array (FPGA), and programmable logic array (PLA). The processor 1001 may integrate a combination of one or more of a central processing unit (CPU), a graphics processing unit (GPU), a modem, and the like. The GPU is configured to render and draw content that needs to be displayed on a display. The modem is configured to process wireless communication. It may be understood that the forgoing modem may not be integrated into the processor 1001, and may be implemented by one chip independently.

The memory 1005 may include a random access memory (RAM), or a read-only memory (ROM). In some embodiments, the memory 1005 includes a non-transitory computer-readable medium. The memory 1005 may be configured to store the instructions, the programs, the codes, the code sets, or the instruction sets. The memory 1005 may include a program storage region and a data storage region. The program storage region may store instructions for implementing the operating system, instructions for at least one function (such as a touch control function, a sound play function, and an image play function), and instructions for implementing each of the foregoing method embodiments. In some embodiments, the memory 1005 may also be at least one storage device distant from the forgoing processor 1001. As shown in FIG. 7, as a computer storage medium, the memory 1005 may include an operating system, a network communication module, a user interface module, and an application program.

In the LiDAR 1000 shown in FIG. 7, the user interface 1003 is mainly configured to provide an input interface for a user to obtain data input by the user; and the processor

1001 can be configured to invoke an application program stored in the memory 1005, and perform the foregoing operations.

Based on the embodiments, the emission apparatus emits the detection laser beam, and the scanning apparatus receives the detection laser beam, emits the detection laser beam to the detection field of view, receives the echo laser beam and deflects the echo laser beam to the receiving apparatus. Then the receiving apparatus receives the echo laser beam. The scanning apparatus includes a rotating mirror, the rotating mirror includes multiple scanning surfaces, and the divergence angles of the at least two adjacent scanning surfaces in the multiple scanning surfaces corresponding to the center of the rotating mirror are unequal. A target detection field of view can be densified by using an irregularly-shaped multi-sided rotating mirror for scanning, thereby meeting a requirement of achieving a large field of view and low resolution for a short-distance object, and achieving a small field of view and high resolution for a long-distance object. In addition, a one-emission multiple-reception mode is also compatible, thereby achieving a wide application range and facilitating large-scale commercial use.

The person skilled in the art can understand that all or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, the read-only storage memory, or the random storage memory, and so on.

What is claimed is:

1. A LiDAR, comprising:
an emission apparatus, configured to emit a detection laser beam;
a scanning apparatus, configured to receive the detection laser beam and emit the detection laser beam to a detection field of view, and to receive an echo laser beam and deflect the echo laser beam to a receiving apparatus; and
the receiving apparatus, configured to receive the echo laser beam,
wherein the scanning apparatus comprises a rotating mirror, the rotating mirror comprises multiple scanning surfaces, and divergence angles of at least two adjacent scanning surfaces in the multiple scanning surfaces corresponding to a center of the rotating mirror are unequal; and
wherein the LiDAR comprises a total detection field of view and a target detection field of view, the rotating mirror comprises an adjacent first scanning surface and second scanning surface,
a divergence angle of the first scanning surface corresponding to the center of the rotating mirror is equal to a sum of half of an angle of view of the total detection field of view and a set first redundant angle; and
a divergence angle of the second scanning surface corresponding to the center of the rotating mirror is equal to a sum of half of an angle of view of the target detection field of view and a set second redundant angle.

2. The LiDAR according to claim 1, wherein the divergence angle of the first scanning surface corresponding to the center of the rotating mirror is greater than the divergence angle of the second scanning surface corresponding to the center of the rotating mirror.

3. The LiDAR according to claim 1, wherein the number of second scanning surfaces corresponding to the target detection field of view is determined based on a densification multiple of the target detection field of view.

4. The LiDAR according to claim 1, wherein the target detection field of view comprises a primary target detection field of view and a secondary target detection field of view, a densification multiple of the primary target detection field of view is greater than a densification multiple of the secondary target detection field of view, and the LiDAR comprises a third scanning surface and a fourth scanning surface; and
a divergence angle of the third scanning surface corresponding to the center of the rotating mirror is equal to a sum of half of the angle of view of the primary target detection field of view and a set third redundant angle; the number of third scanning surfaces is equal to the densification multiple of the primary target detection field of view minus the densification multiple of the secondary target detection field of view; a divergence angle of the fourth scanning surface corresponding to the center of the rotating mirror is equal to a sum of half of the angle of view of the secondary target detection field of view and a set fourth redundant angle; and the number of fourth scanning surfaces is determined based on a densification multiple of the secondary target detection field of view.

5. The LiDAR according to claim 1, wherein the LiDAR is in a mode in which one emission corresponds to at least two receptions.

6. The LiDAR according to claim 1, wherein the divergence angle of the emission apparatus satisfies:

$$\delta\theta = \frac{L}{f}$$

wherein L is a light emission size of a light source of the emission apparatus, and f is a focal length of the emission apparatus.

7. The LiDAR according to claim 1, wherein an interval between scanning lines of two adjacent groups of emission apparatuses satisfies:

$$\Delta\theta = \frac{L_{LD}}{f}$$

wherein $L_{LD}$ is an interval between lasers in the emission apparatus, and f is a focal length of the emission apparatus.

* * * * *